(12) United States Patent
Hanna et al.

(10) Patent No.: US 10,038,359 B2
(45) Date of Patent: Jul. 31, 2018

(54) ROTOR AND METHOD OF FORMING

(71) Applicant: GM GLOBAL TECHNOLOGY OPERATIONS LLC, Detroit, MI (US)

(72) Inventors: Michael D. Hanna, West Bloomfield, MI (US); John S. Agapiou, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/902,618

(22) Filed: Feb. 22, 2018

(65) Prior Publication Data
US 2018/0183308 A1    Jun. 28, 2018

Related U.S. Application Data

(62) Division of application No. 14/677,466, filed on Apr. 2, 2015.

(60) Provisional application No. 61/975,310, filed on Apr. 4, 2014.

(51) Int. Cl.
| | |
|---|---|
| *B22D 17/00* | (2006.01) |
| *H02K 17/16* | (2006.01) |
| *H02K 15/00* | (2006.01) |
| *B22D 19/00* | (2006.01) |

(52) U.S. Cl.
CPC ....... *H02K 17/165* (2013.01); *B22D 19/0054* (2013.01); *H02K 15/0012* (2013.01); *B22D 17/00* (2013.01)

(58) Field of Classification Search
CPC .. H02K 15/0012; H02K 17/16; H02K 17/165; H02K 17/18; H02K 17/185; B22D 17/00; B22D 19/0054

USPC ... 310/52, 54, 64, 156.22, 156.61, 166, 211; 164/112, 332
See application file for complete search history.

(56) References Cited

U.S. PATENT DOCUMENTS

| | | | | |
|---|---|---|---|---|
| 5,304,877 | A * | 4/1994 | Baek ............... | H02K 17/165 310/211 |
| 5,758,709 | A * | 6/1998 | Boyd, Jr. ......... | B22D 19/0054 164/109 |
| 6,991,021 | B2 * | 1/2006 | Ramirez .......... | B22D 13/04 164/103 |
| 2004/0139596 | A1 * | 7/2004 | Hsu ................. | B22D 19/0054 29/598 |

(Continued)

*Primary Examiner* — Bernard Rojas
*Assistant Examiner* — Rashad Johnson
(74) *Attorney, Agent, or Firm* — Quinn IP Law (57) ABSTRACT

A rotor casting includes a lamination stack and a cast structure including proximal and distal cast end rings respectively adjacent proximal and distal end faces of the lamination stack. Cast axial ribs are distributed radially on a peripheral surface of the lamination stack and extend between the proximal and distal cast end rings. Cast feed members extend axially from the proximal cast end ring and are respectively positioned radially between an adjacent pair of axial ribs. In one example, cast bar segments integral to the proximal and distal cast end rings are formed in axial slots of the lamination stack. In one example, a bar insert in each axial slot has insert ends that extend respectively from the proximal and distal end faces of the lamination stack and are fully encapsulated respectively in the proximal and distal cast end rings. A method of forming the rotor casting is provided.

11 Claims, 6 Drawing Sheets

(56) References Cited

U.S. PATENT DOCUMENTS

| | | | | |
|---|---|---|---|---|
| 2008/0231138 A1* | 9/2008 | Onimaru | .................. | H02K 1/06 |
| | | | | 310/216.018 |
| 2009/0026877 A1* | 1/2009 | Alfermann | ........... | H02K 15/024 |
| | | | | 310/261.1 |
| 2010/0102666 A1* | 4/2010 | Kaiser | ................ | H02K 15/0012 |
| | | | | 310/211 |
| 2010/0243197 A1* | 9/2010 | Osborne | ................ | H02K 15/02 |
| | | | | 164/520 |
| 2011/0062819 A1* | 3/2011 | Lyons | ................ | H02K 15/0012 |
| | | | | 310/261.1 |
| 2012/0210563 A1* | 8/2012 | Wang | ................ | H02K 15/0012 |
| | | | | 29/598 |
| 2012/0217838 A1* | 8/2012 | Kleber | ............... | H02K 15/0012 |
| | | | | 310/211 |
| 2016/0056682 A1* | 2/2016 | Cocks | ..................... | H02K 5/18 |
| | | | | 310/59 |
| 2016/0197539 A1* | 7/2016 | Agapiou | ............ | H02K 15/0012 |
| | | | | 310/211 |

* cited by examiner

ROTOR AND METHOD OF FORMING

CROSS-REFERENCE TO RELATED APPLICATION

This application claims the benefit of U.S. Non-provisional application Ser. No. 14/677,466 filed Apr. 2, 2015, and to U.S. Provisional Application No. 61/975,310, filed Apr. 4, 2014, which is hereby incorporated by reference in its entirety.

TECHNICAL FIELD

The disclosure relates to a rotor and a method of forming the rotor.

BACKGROUND

Electromagnetic machines such as electric motors, generators, and traction motors are useful for converting energy from one form to another. Such electromagnetic machines often include an element rotatable about an axis of rotation. The rotatable element or rotor may be coaxial with a static element or stator, and energy may be converted via relative rotation between the rotor and stator.

One type of electromagnetic machine, an alternating current induction motor, uses induced current flow to magnetize portions of the rotor during motor operation. More specifically, the rotor may be composed of a stack of steel laminations including teeth shaped to form poles and define slots therebetween. The poles may be separated by conductor bars disposed in the slots and electrically connected to shorting rings located at opposing ends of the lamination stack. Induced current may flow through the conductor bars which are disposed parallel to the axis of rotation along a periphery of the rotor. Each conductor bar may be electrically connected to every other conductor bar by the two shorting rings disposed at opposite ends of the rotor. The interaction of currents flowing in the conductor bars of the rotor winding and the stator's rotating magnetic field generates torque.

SUMMARY

A method of forming a rotor casting includes inserting a lamination stack defining a plurality of axial slots into a die cavity having a double gating system including a plurality of feeder gates and a plurality of side gates, and providing molten material via the feeder gates to the die cavity. The molten material flows from the feeder gates via a first cast ring element to the plurality of side gates and the periphery of the lamination stack and via the side gates to a second cast ring element and the periphery of the lamination stack to form a cast structure of the rotor casting. The cast structure of the rotor casting includes the first and second cast ring elements formed at opposing ends of the lamination stack, a plurality of cast ribs formed in the side gates and distributed radially on the periphery of the lamination stack, and a cast skin formed between the periphery of the lamination stack and the die cavity and extending between the cast ribs and into the slot openings to substantially encapsulate the periphery of the lamination stack in the cast material. The cast structure further includes a plurality of cast feed members defined by the feeder gates and subsequently removed from the rotor casting.

In one example, conductor bars are formed in the rotor casting by casting cast bar segments in the slots of the lamination stack. In this example, the lamination stack is inserted into the die cavity such that molten material flows into the slots of the lamination stack via the slot openings at the opposing ends of the lamination stack from the cast ring elements and via the axial slot openings at the periphery of the lamination stack from the side gates to form a plurality of cast bar segments which form the conductor bars of the rotor assembly.

In another example, the conductor bars of the rotor assembly comprise a plurality of bar inserts which are inserted into the slots of the lamination stack prior to casting, such that opposing bar ends of each bar insert extend respectively from opposing ends of the lamination stack. The lamination pack including the lamination stack and bar inserts is inserted in the die cavity and the rotor casting is formed such that the opposing bar ends are overcast by the respective cast ring element at each rotor end to form the conductor bars of the rotor assembly. In one example, a bar end of the insert bar defines a hole through which molten material flows during the casting operation to facilitate molten material flow during casting of the cast ring element and minimize or substantially eliminate porosity formation during casting of the cast ring element.

A rotor assembly is also disclosed, the rotor assembly being formed by removing material from the periphery of the rotor casting to define a finished surface of the rotor assembly.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
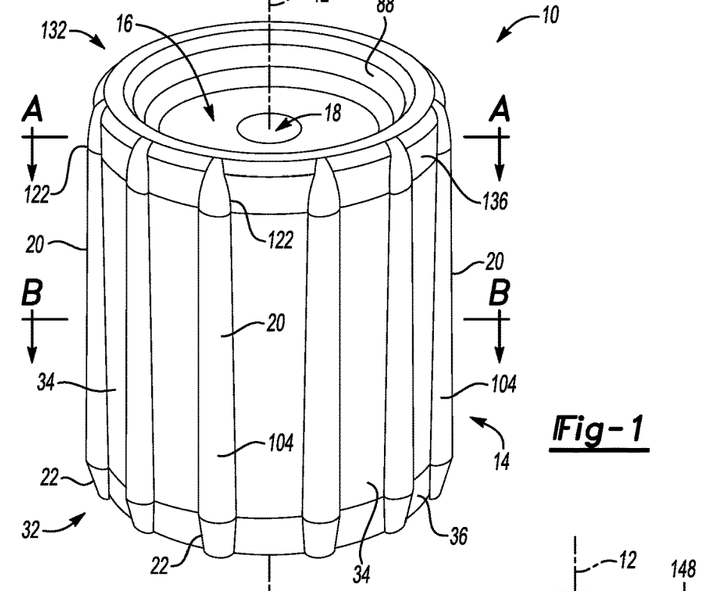
FIG. 1 is a schematic illustration of a perspective view of a rotor casting.
Figure 2:
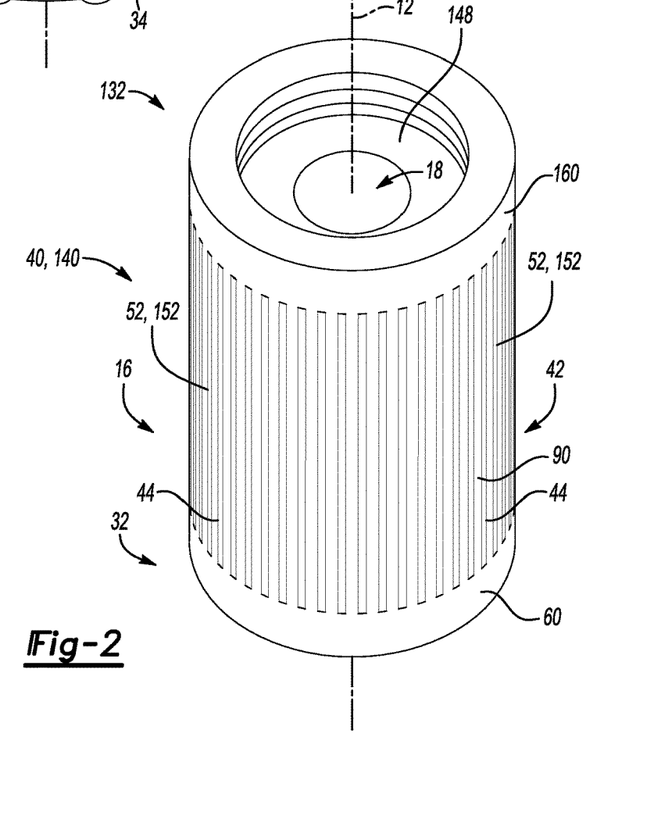
FIG. 2 is a schematic illustration of a perspective view of a rotor assembly formed from the rotor casting of FIG. 1.

Referring to the Figures, wherein like reference numerals refer to like elements, the elements shown in FIGS. 1-14 are not necessarily to scale or proportion. Accordingly, the particular dimensions and applications provided in the drawings presented herein are not to be considered limiting. A rotor casting 10 is shown generally in FIG. 1 and includes a lamination stack 42 shown in FIG. 4 and a cast structure 14 shown generally in FIG. 5. In a first example configuration, the rotor casting 10 includes a lamination pack 16 shown generally in FIG. 4 and including a plurality of bar inserts 54 shown generally in FIG. 3 which are inserted into slots 44 of the lamination stack 42 such that opposing insert ends 56 of the bar insert 54 extend axially from respective opposing end faces 48, 148 of the lamination stack 42. The cast structure 14 includes opposing end cast ring elements 36, 136, a plurality of cast ribs 20, a cast peripheral skin 34 (shown in FIG. 1), and cast feed members 28. A cast ring element may also be referred to herein as a cast end ring. As shown in FIG. 1, the cast peripheral skin 34 extends between adjacent ribs 20 such that the cast structure 14 at least partially encapsulates a peripheral surface 66 of the lamination stack 42. Each of the cast ring elements 36, 136 includes an inner rim 88 which extends over a respective end face 48, 148 of the lamination stack 42 to constrain axial movement of lamination stack 42 relative to the cast structure 14. A rotor assembly 40 shown generally in FIG. 2 is formed by removing material from the rotor casting 10 of FIG. 1 to form a finished surface 90, for example, by machining or turning the rotor casting 10 to remove, for example, the cast ribs 20 and cast peripheral skin 34. The rotor assembly 40 may be useful as a component of an electromagnetic machine (not shown) for automotive applications, such as an alternating current induction motor. However, the rotor assembly 40 may also be useful for non-automotive applications, including as a component of generators and electric motors for residential and commercial applications.

Figure 5:
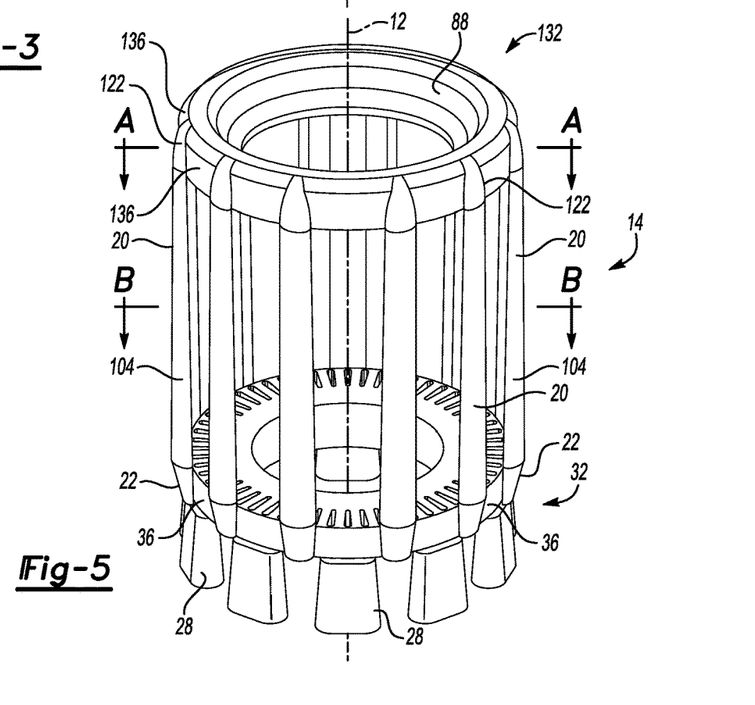
FIG. 5 is a schematic illustration of a perspective view of a cast structure of a first example configuration of the rotor casting of FIG. 1, shown without the cast peripheral skin for clarity of illustration.

By way of general explanation and described with reference to FIG. 1, the rotor assembly 40 may be rotatable about an axis 12 and may rotate with respect to a stationary stator (not shown) of the electromagnetic machine (not shown). The axis 12 may also be referred to herein as an axis 12 of rotation and may also be used to refer to the longitudinal axis 12 of the various components of the rotor casting 10 including the lamination stack 42, the lamination pack 16, and the cast structure 14. For example, the axis 12 may be defined by a bore 18 extending through the axial length of the lamination pack 16. The rotor casting 10 and the rotor assembly 40 formed therefrom has a first end shown generally at 32 and which may be referred to herein as a proximal end 32, and further has a second end opposing the first end 32 and shown generally at 132, which may be described herein as a distal end 132. For purposes of illustration, in a non-limiting example the proximal end 32 of the rotor casting 10 and rotor assembly 40 formed therefrom corresponds to that end of the rotor casting 10 which is the end to which molten material 62 flow (see FIGS. 13 and 14) is first introduced through a plurality of feeder gates 30 during the casting process forming the rotor casting 10, as described in further detail herein, e.g., the end of the rotor casting 10 from which a plurality of cast feed members 28 extends as-cast, as shown in FIG. 5.

Figure 3:
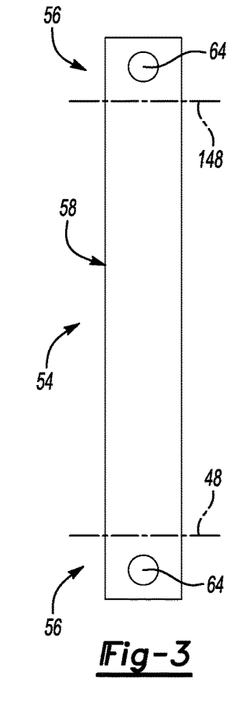
FIG. 3 is a schematic illustration of a plan view of a first configuration of a conductor bar insert.
Figure 4:
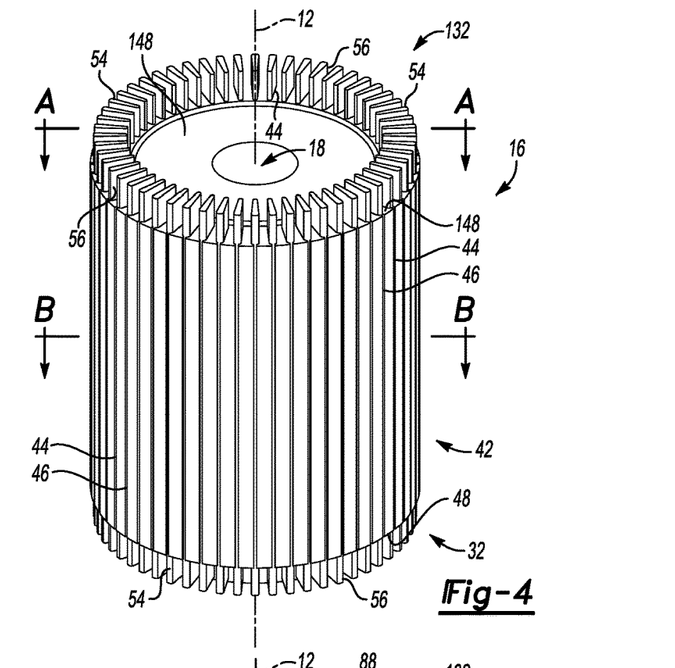
FIG. 4 is a schematic illustration of a perspective view of a first example configuration of a lamination pack including the conductor bars inserts of FIG. 3 inserted into a lamination stack in preparation for forming the rotor casting of FIG. 1.
Figure 11:
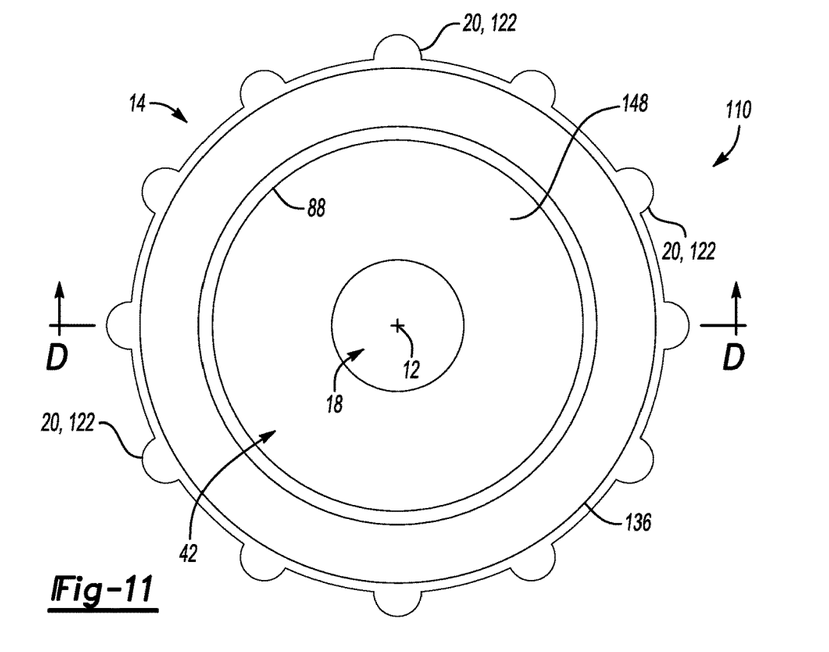
FIG. 11 is a schematic cross-sectional view of section A-A of a third example configuration the rotor casting of FIG. 1 including a lamination stack and cast conductor bar segments.

The rotor casting 10 includes a lamination pack 16, shown in a first example configuration in FIG. 4. In the first example configuration shown in FIG. 4, the rotor casting 10 includes a lamination pack 16 including the lamination stack 42 and the plurality of bar inserts 54 (see FIG. 3) forming the conductor bars 52. In a second example configuration shown in FIG. 9, a rotor casting 100 includes the lamination pack 16 including the lamination stack 42 and a plurality of bar inserts 154 (see FIG. 8) forming the conductor bars 152. In a third example configuration shown in FIG. 12, a rotor casting 110 includes the lamination stack 42, however the slots 44 of the lamination stack 42 are left empty to receive molten material 62 during the casting process to form cast bar segments 70, e.g., in the third example configuration no bar inserts are inserted into the lamination stack 42 prior to casting. Further, as shown in FIG. 11, in the third example configuration the cast ring elements 36, 136 of the rotor casting 110 are formed only of molten material 62 such that cast bar segments 70 and cast ring elements 36, 136 are cast simultaneously and are unitary with each other and integral to the cast structure 14. The cast ring elements 36, 136 and the cast bar segments 70 are thus electrically connected with one another.

Figures 8, 9, 10:
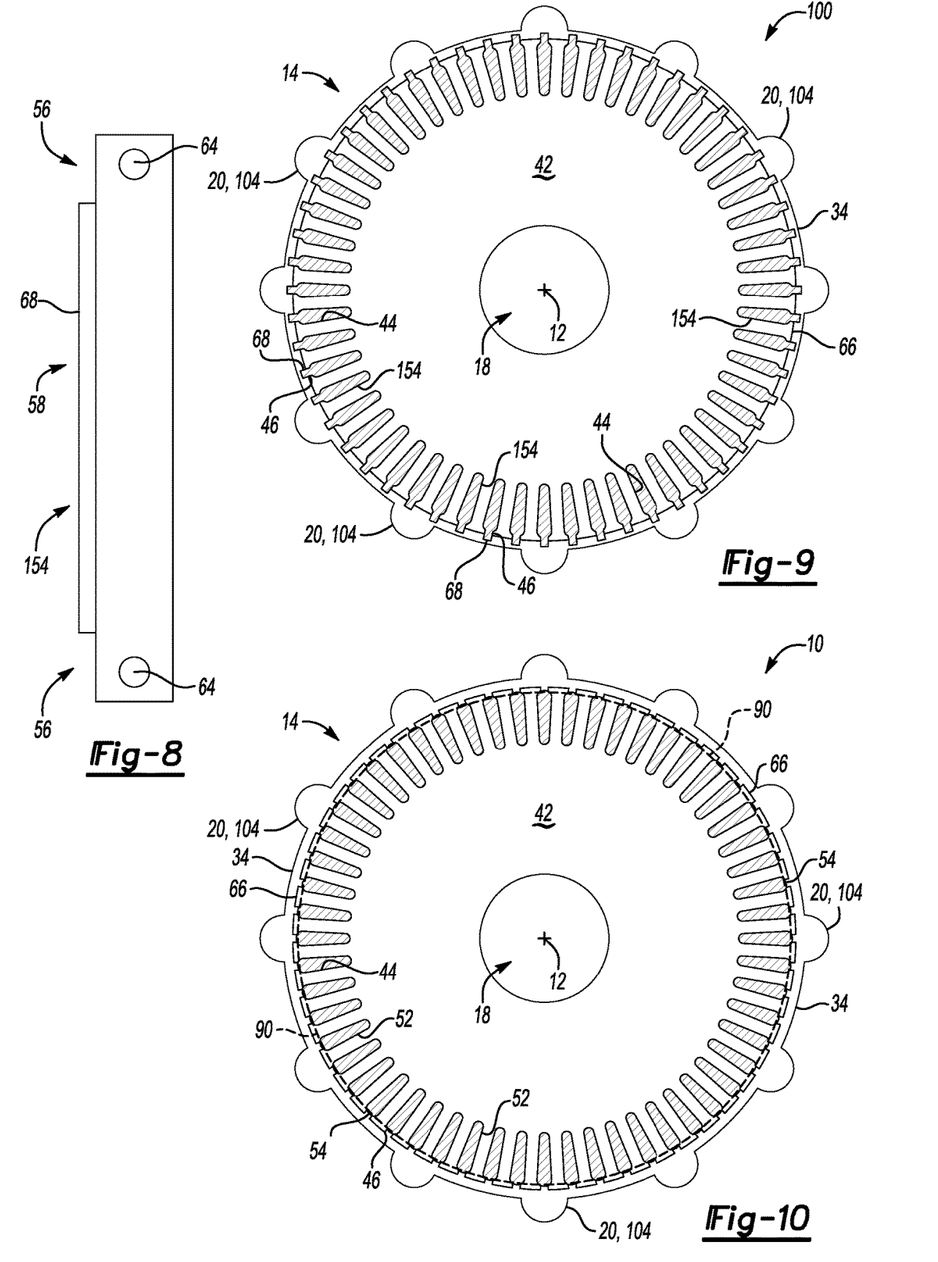
FIG. 8 is a schematic illustration of a plan view of a second configuration of a conductor bar insert.
FIG. 9 is a schematic illustration of a cross-sectional view of section B-B of a second example configuration of the rotor casting of FIG. 1 including a lamination pack including the conductor bar inserts of FIG. 8 inserted into a lamination stack.
FIG. 10 is a schematic illustration of a cross-sectional view of section B-B of the first example configuration rotor casting of FIG. 1 showing a broken line corresponding to the finished surface of the rotor assembly of FIG. 2.

The lamination stack 42 may be formed from a plurality of lamination steels, which for clarity of illustration are not shown in detail in the figures. More specifically, each of the plurality of lamination steels may be an individual annular layer (not shown) of lamination steel, e.g., silicon steel, and may be stacked adjacent another one of the plurality of lamination steels to form the lamination stack 42. The lamination stack 42 may have bore 18 extending the axial length of the lamination stack 42, and include the proximal end face 48 and the distal end face 148 spaced apart from the proximal end face 48. The lamination stack 42 defines the plurality of slots 44 extending from the proximal end face 48 to the distal end face 148. That is, when the lamination steels are stacked adjacent one another, each one of the individual annular lamination steels may align with every other one of the individual lamination steels to define bore 18 and the plurality of slots 44 spaced about the periphery 66 of the lamination stack 42. The periphery 66 may also be referred to herein as a peripheral surface 66. In one example, the plurality of slots 44 may extend through the lamination stack 42 parallel to the axis of rotation 12. Each slot 44 may be configured to receive a bar insert 54 as shown in FIGS. 4 and 9. The examples provided herein are non-limiting. For example, although not shown, the lamination steels may be skewed relative to each other such that the plurality of slots 44 defined by the lamination stack 42 may also be arranged in a skewed configuration about the axis of rotation 12. In another example not shown, bar inserts 54 may be inserted into the plurality of slots 44 of the lamination stack 42, then the lamination steels may be skewed relative to each other such that the plurality of slots 44 and the bar inserts 54 inserted therein are also arranged in a skewed configuration about the axis of rotation 12.

Each slot 44 defines an axial slot opening 46 such that each slot 44 is open to the periphery 66, e.g., the peripheral surface 66, of the lamination stack 42, such that during the casting operation, molten material 62 may enter the slot 44 via the axial slot opening 46. Each slot 44 is open at either end of the lamination stack 42 such that each slot 44 is open to the proximal and distal end 32, 132 faces of the lamination stack 42, and such that in the first and second example configurations shown in FIGS. 4 and 9 respectively, each slot 44 can receive a bar insert 54, 154 inserted thereto, or alternatively, such that in the third example configuration shown in FIGS. 11 and 12, molten material 62 can flow into the slot 44 during the casting process via the slot openings 46 to form a cast bar segment 70.

The slots 44 defined by the lamination stack 42 are spaced equidistantly about the axis of rotation 12. The lamination stack 42 may include, for example, from thirty (30) to one hundred fifty (150) slots 44, such that after assembly and casting the rotor casting 10 includes a plurality of conductor bars 52 corresponding in number to the number of slots 44. Each conductor bar 52 is configured to conduct electrical current during operation of the electromagnetic machine (not shown). Therefore, each conductor bar 52 is formed from an electrically-conductive material.

In the first and second example configurations of rotor castings 10, 100 shown in FIGS. 4 and 9 respectively, each conductor bar 52, 152 is formed by a respective bar insert 54, 154, where each of the bar inserts 54, 154 is formed of an electrically conductive material and is inserted into a slot 44 in the lamination stack 42 prior to casting the rotor casting 10. In the third example configuration of a rotor casting 110 shown in FIG. 12, the cast material forming the cast bar segment 70 is an electrically conductive material. By way of non-limiting example, the electrically conductive material forming the conductor bars 52, 152 may be an aluminum-based material or a copper-based material.

Figure 7:
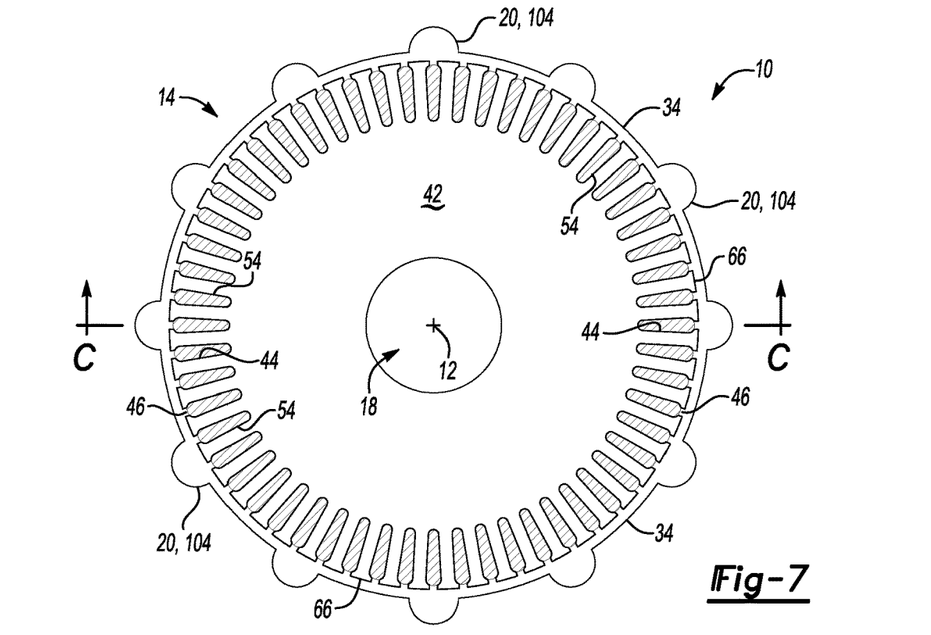
FIG. 7 is a schematic cross-sectional view of section B-B of the first example configuration of the rotor casting of FIG. 1 including the lamination pack of FIG. 4.

Referring to the first example configuration shown in FIGS. 3 and 4, a bar insert 54 includes opposing insert ends 56 and a bar central portion 58 therebetween. Referring to FIGS. 3 and 4, the bar insert 54 of FIG. 3 is inserted into each of the slots 44 of the lamination stack 42 as shown in FIG. 4 such that the central portion 58 of the bar insert 54 is disposed adjacent and in direct contact with the lamination stack 42 within the slot 44 and such that the opposing insert ends 56 of the bar insert 54 extend from, respectively, the distal and proximal end 132, 32 faces of the lamination stack 42. That is, the bar insert 54 directly abuts the lamination stack 42 within the slot 44 and is not separated from the lamination stack 42 by, for example, a layer of varnish, a coating, a resin, and/or a separator. As shown in FIGS. 4 and 7, the central portion 58 of the bar insert 54 is fully contained in the slot 44 and does not extend into the axial slot opening 46. In one example, the insert ends 56 of each bar insert 54 each define a hole 64 through which molten material 62 flows during the casting operation to facilitate molten material 62 flow in the cast ring element 36, 136 to minimize or substantially eliminate porosity formation in the cast ring element 36, 136 during casting. In the example shown, the hole 64 is configured as an oval or round hole 64 such that the molten material 62 flows through the hole 64 with little to no turbulence. The example shown is non-limiting, and other hole 64 configurations and shapes may be used which provide for uniform and non-turbulent flow of the molten material 62 through the hole 64 around the insert end 56 to avoid the formation of porosity during the casting operation. By way of non-limiting example, the hole may be sized relative to the bar insert 54 such that the cross-sectional area of the hole is less than the cross-sectional area of the insert end 56 extending from the end face 48, 148 of the lamination pack 42. In the non-limiting example shown, the insert ends 56 are generally rectangular with squared off corners. Other configurations may be used, for example, the insert ends 56 may have chamfered or rounded edges or may be otherwise configured to correspond with the profile of the cast ring elements 36, 136 and/or the profile of the finished shorting rings 60, 160, and such that the insert ends 56 are fully encapsulated by the cast material forming the shorting rings 60, 160.

As shown in FIGS. 5, 6, 7 and 13, during casting of the rotor casting 10, molten material 62 flows from the feeder gates 30 and side gates 24 around the insert ends 56 and through the holes 64 defined by the insert ends 56 to form the cast ring elements 36, 136, such that the insert ends 56 are fully encapsulated in the cast ring elements 36, 136 to constrain radial and axial movement of the bar inserts 54, 154 and the lamination stack 42, and to electrically connect the cast ring elements 36, 136 and the bar inserts 54, 154 with one another. Inner rims 88 defined by the proximal and distal cast ring 36, 136 elements are formed in contact with the proximal and distal end 32, 132 faces of the lamination stack 42 and extend radially inward from the periphery 66 of the lamination stack 42 to constrain axial movement of the lamination stack 42. Further, as shown in FIGS. 5, 6, 7 and 13, molten material 62 flows through the side gates 24 and between the periphery 66 of the lamination stack 42 and the surface of a die cavity 74 to form cast axial ribs 20 and a peripheral skin 34 which extends between the axial ribs 20 and into the slot openings 46 of the lamination stack 42 to encapsulate the periphery 66 of the lamination stack 42. By way of example, lamination stack 42 is positioned in the die cavity 74 such that a gap 106 between the periphery 66 of the lamination stack 42 and an adjacent peripheral surface 102 of the die cavity 74 is uniform about the periphery 66 of the lamination stack 42, and such that the cast skin 34 formed therebetween is of a uniform thickness. The uniform thickness of the cast skin 34 facilitates removal of all or a portion of the skin thickness during finishing of the rotor casting 10 to form the rotor assembly 40, as described in further detail herein. By way of non-limiting example, the radial thickness of the cast skin 34 may be uniform and in the range of 0-2.0 mm, and may be nominally 1.0 mm in thickness. In one example, the rotor casting 10 shown in FIGS. 6-7 may be formed with minimal or negligible skin 34, for example, by configuring the die cavity such that the periphery 66 of the lamination stack 42 is slip fit to the adjacent peripheral surface 102 of the section of the die cavity 74 defined by a second die component 84 (see FIG. 13), e.g. such that molten material 62 flowing through the side gates 24 enters the side gates 24 through a proximal transition 26 and exits through a distal transition 126 of each side gate 24, and is substantially constrained from flowing across the periphery 66 from the side gate 24, such that the resulting cast skin 34 may have a radial thickness in the range of 0-0.25 mm. In another example, the rotor casting 100 shown in FIG. 9 may be formed with a cast skin 34 having a radial thickness substantially equal to the radial distance a bar tab 68 extends from the periphery 66 of the lamination stack 42, such that during finished machining of the rotor casting 100, for example, by turning, the turning tool is in contact with and cutting a continuous peripheral surface including the cast skin 34 and bar tabs 68 to facilitate a smooth cutting and forming the uniform finished surface 90. In one example, referring to the cast rotor 100 shown in FIG. 9, the bar tab 68 may extend radially 0.1-0.25 mm from the periphery 66 of the lamination stack 42.

Figure 6:
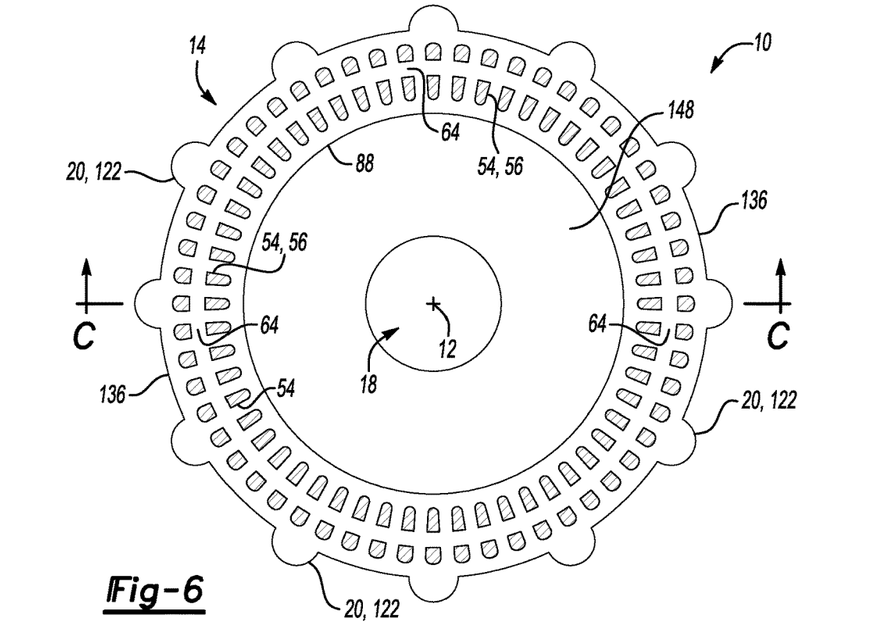
FIG. 6 is a schematic cross-sectional view of section A-A of the first example configuration of the rotor casting of FIG. 1 including the lamination pack of FIG. 4.

Referring to FIGS. 8 and 9, a second example configuration of a rotor casting 100 is shown in FIG. 9 including the bar insert 154 shown in FIG. 8. The bar insert 154 includes opposing insert ends 56 and bar central portion 58 therebetween. The bar insert 154 further includes the tab 68 extending the axial length of the central portion 58. Referring to FIGS. 8 and 9, a bar insert 154 of FIG. 8 is inserted into each of the slots 44 of the lamination stack 42 as shown in FIG. 9 such that the central portion 58 of the bar insert 54 is disposed adjacent and in direct contact with the lamination stack 42 within the slot 44 and such that the opposing insert ends 56 of the bar insert 54 extend from, respectively, the distal and proximal end 132, 32 faces of the lamination stack 42. That is, the bar insert 54 directly abuts the lamination stack 42 within the slot 44 and is not separated from the lamination stack 42 by, for example, a layer of varnish, a coating, a resin, and/or a separator. As shown in FIGS. 8 and 9, the tab 68 is configured such that when the bar insert 154 is inserted into the slot 44, the tab 68 is positioned in the slot opening 46 as shown in FIG. 9. The tab 68 may extend radially into the slot opening 46 such that the tab 68 is flush with or extends radially outward from the periphery 66 of the lamination stack 42. The tab 68 positioned in the slot opening 46 may constrain radial movement of the bar insert 154 relative to the slot 44 and/or constrain radial movement of the lamination sheets (not shown) relative to each other in the lamination stack 42. As shown in FIGS. 5, 6, and 9 and with reference to FIG. 13, during casting of the rotor casting 100, molten material 62 flows from the feeder gates 30 and side gates 24 around the insert ends 56 and through the holes 64 defined by the insert ends 56 to form the cast ring elements 36, 136, such that the insert ends 56 are fully encapsulated in the cast ring elements 36, 136 to constrain radial and axial movement of the bar inserts 54, 154 and the lamination stack 42, and to electrically connect the cast ring elements 36, 136 and the bar inserts 54, 154 with one another. Inner rims 88 defined by the proximal and distal cast ring 36, 136 elements are formed in contact with the proximal and distal end 32, 132 faces of the lamination stack 42 and extend radially inward from the periphery 66 of the lamination stack 42 to constrain axial movement of the lamination stack 42. Further, as shown in FIGS. 5, 6, 9 and 13, molten material 62 flows through the side gates 24 and between the periphery 66 of the lamination stack 42 and the surface of the die cavity 74 to form cast axial ribs 20 and a peripheral skin 34 which extends between the axial ribs 20 and into the slot openings 46 of the lamination stack 42 and/or peripherally between the tabs 68 to encapsulate the periphery 66 of the lamination stack 42.

Each bar insert 54, 154 may be configured to conduct electrical current during operation of the electromagnetic machine (not shown). Therefore, each bar insert 54 may be formed from an electrically-conductive material. For example, each bar insert 54 may be formed from copper or a copper alloy such as a copper nickel alloy or a copper boron alloy. Advantageously, the bar insert 54, 154 may be formed from an electrolytic tough pitch copper alloy, such as C110 copper alloy, or other electrically conductive alloy so that the rotor casting 10, 110 is economical to manufacture. As used herein, the terminology electrolytic tough pitch copper alloy refers to a copper alloy including oxygen in an amount of from about 0.02 parts by volume to about 0.04 parts by volume based on 100 parts by volume of the copper alloy. Alternatively, the bar insert 54 may be formed from an oxygen-free copper alloy, such as C102 copper alloy. As used herein, the terminology oxygen-free copper alloy refers to a copper alloy including oxygen in an amount of from about 0.05 parts by volume to about 0.1 parts by volume based on 100 parts by volume of the copper alloy. The example of a copper-containing bar insert 54, 154 is intended to be non-limiting, and the bar insert 54, 154 may be made of any suitable electrically-conductive material formable into a bar insert 54, 154 which may be overcast as described herein. For example, the bar insert 54, 154 may be made of an aluminum metal alloy or other electrically conductive alloy which may be formed into bar insert 54, 154 for insertion into a lamination stack 42 and which may be overcast by the method described herein to form a conductor bar 52, such that the conductor bars 52 formed by the bar inserts are electrically connected to the cast ring elements 36, 136 and with one another in the rotor casting 10, 110.

Referring now to FIG. 10, shown is a cross-section of the rotor casting 10 including a dashed line indicating the finished surface 90 of the rotor assembly 40 relative to the rotor casting 10. The rotor assembly 40 is formed from the rotor casting 10 by removing material from the perimeter of the rotor casting 10 to define the finished surface 90. As shown in FIG. 10 and referring also to FIGS. 1 and 2, at least the cast ribs 20 and a substantial amount of the cast skin 34 extending between the cast ribs 20 is removed to provide the finished surface 90. In one example, the "substantial amount of cast skin 34" removed from the periphery 66 of the lamination stack 42 includes substantially all of the cast skin 34 on the outer diameter of the lamination steels forming the lamination stack 42, however may exclude removal of the cast material present in the slot openings 46. By way of example, forming the finished surface 90 may include removing all of the cast ribs 20 and cast skin 34 and additionally removing material from the peripheral surface 66 of the lamination stack 42 including material in the slot opening 46 such that the conductor bars 52 are exposed at the periphery 66 of the rotor assembly 40, as shown in FIG. 2 with reference to FIGS. 4 and 10.

Additional machining and/or finishing may be performed on either or both of the proximal and distal cast ring 36, 136 elements to finish forming the respective proximal and distal shorting rings 60, 160 of the rotor assembly 40. It would be understood that the cast feed members 28 would be removed from the rotor casting 10, either at time of casting or subsequently, as a step in finishing the rotor casting 10 to provide the rotor assembly 40. Removing the cast feed members 28 from the rotor casting 10 may include machining or other finishing of the proximal end 32 of the rotor casting 10 to form the proximal shorting ring 60.

Further, machining and/or finishing may be performed on the rotor assembly 40 to balance the rotor assembly 40. For example, additional material may be removed from one or more surfaces 66, 90 of the rotor assembly 40 such as the periphery 66 of the lamination pack 16 and/or surfaces 66, 90 defined by the proximal and/or distal shorting rings 60, 160 to balance the rotor assembly 40 about the axis of rotation 12.

A method of forming a rotor assembly 40 from a rotor casting 10, 100, 110 includes forming the rotor casting 10, 100, 110 by positioning lamination stack 42 in die cavity 74 of a casting die 80. The die cavity 74 defines a rotor casting 10 including proximal and distal cast end rings 36, 136 at opposing ends of the lamination stack 42, and flowing molten material 62 into the die cavity 74 via a double gating system including feeder gates 30 and side gates 24 defined by the casting die 80, to form the rotor casting 10 including the lamination stack 42 and the cast structure 14. The method may include stacking a plurality of lamination steels (not shown in detail) adjacent and in contact with one another to form the lamination stack 42. That is, as set forth above and described with reference to FIG. 4, stacking may include forming the lamination stack 42 having the proximal end face 48 and the distal end face 148, and defining the bore 18 and plurality of slots 44 through the lamination stack 42 that extend from the proximal end face 48 to the distal end face 148. The individual lamination steels may be stacked adjacent one another via any process. For example, each lamination steel may first be individually stamped to define the bore 18 and then subsequently stacked and pressed adjacent another lamination steel using a mandrel 50. In the example shown in FIG. 13, and referring to the first and second example configurations of the rotor castings 110 shown in FIGS. 3-4 and 6-9, the method further includes inserting a plurality of bar inserts 54 into the plurality of slots 44 of the lamination stack 42 to form a lamination pack 16 as shown generally in FIG. 4 and previously described herein, prior to positioning the lamination pack 16 in the die cavity 74.

Figure 13:
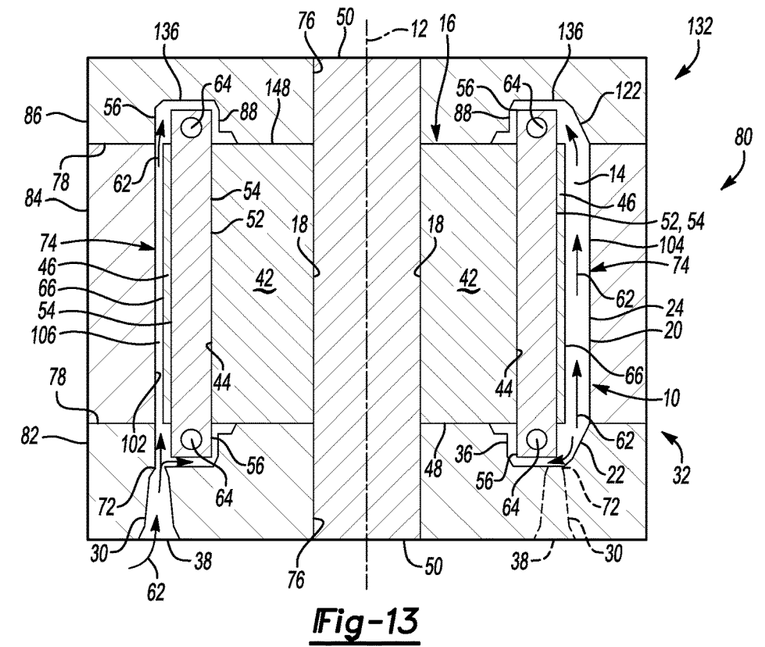
FIG. 13 is a schematic cross-sectional view of a casting die having a double gate system including a plurality of feeder gates and a plurality of side gates, showing a cross-sectional view of the lamination pack of FIG. 4 including bar inserts and positioned in a die cavity of the casting die during casting of the first example configuration of the rotor casting of FIG. 1.
Figure 14:
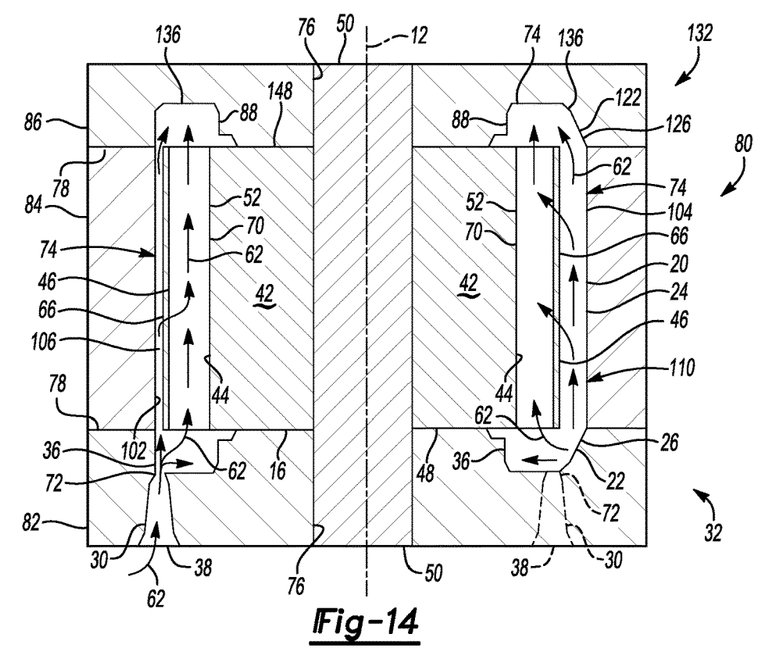
FIG. 14 is a schematic cross-sectional view of the casting die of FIG. 13 showing a cross-sectional view of a lamination stack positioned in the die cavity during casting of the third example configuration of the rotor casting of FIG. 1.

In the example shown, the die cavity 74 includes a plurality of die components 82, 84, 86 and includes and/or is configured to receive a mandrel 50. The lamination stack 42 may be positioned on the mandrel 50 to locate the lamination stack 42 relative to the die cavity 74. In one example and as shown in FIGS. 13 and 14, the mandrel 50 may be configured to interface with the bore 18 of the lamination stack 42. In the example shown, the casting die 80 includes a first, second and third component 82, 84, 86, which may be interlocking or otherwise oriented to each other relative to die 80 parting lines 78 to define the die cavity 74. In the example shown, the first and third die components 82, 86 define, respectively, the proximal and distal cast ring 36, 136 elements of the rotor cast. Advantageously, the first and third die components 82, 86 each include an aperture 76 for receiving the mandrel 50, such that the lamination stack 42 positioned on the mandrel 50 and the proximal and distal cast ring 36, 136 elements defined by the first and third die components 82, 86 are each aligned to the axis 12 of the mandrel 50 and to each other during casting of the rotor casting 10, 100, 110 to facilitate balancing of the rotor assembly 40 during subsequent finishing and balancing operations performed on the rotor casting 10, 100, 110.

The casting die 80 includes a plurality of feeder gates 30, each feeder gate 30 extending from the proximal end 32 of the die cavity 74 and in fluid communication with the proximal end 32 of the die cavity 74 via a passage 72. In one example, the feeder gates 30 are distributed radially along the die cavity 74 and relative to the axis 12 such that each feeder gate 30 is immediately adjacent the peripheral surface 102 of the die cavity 74 and the periphery 66 of the lamination stack 42 positioned in the die cavity 74 to facilitate molten material 62 flow from the feeder gates 30 into the gap 106 defined between the periphery 66 of the lamination stack 42 and the peripheral surface 102 of the die cavity 74 adjacent the periphery 66. Further, each of the feeder gates 30 may be radially disposed between and in fluid communication with adjacent side gates 24 to facilitate the flow of molten material 62 from the feeder gates 30 into a plurality of side gates 24 defined by the die cavity 74.

The plurality of side gates 24 are disposed parallel to the axis 12 of the die cavity 74 and distributed radially along the peripheral surface 102 of the die cavity 74 and adjacent the periphery 66 of the lamination stack 42 to form a plurality of axial ribs 20 distributed radially along the surface of the rotor casting 10, 100, 110 as shown, for example, in FIGS. 1 and 5-7. Each of the side gates 24 extends radially outward from the peripheral surface 102 of the die cavity and from a proximal end 32 of the die cavity 74 to a distal end 132 of the die cavity 74, to provide a side gate opening extending the axial length of the die cavity 74. In the example shown, the first, second and third die components 82, 84, 86 cooperate to define the side gates 24. By way of example and referring to the rotor casting 10 and cast structure 14 shown in FIGS. 1 and 5, and the casting die 80 shown in FIGS. 13 and 14, the first and third die components 82, 86 define, respectively, a proximal and a distal transition 26, 126 of each side gate 24 configured to form, respectively, a cast proximal and a cast distal rib terminus 22, 122 of the ribs 20 of the rotor casting 10. The proximal and distal transitions 26, 126 of the side gates 24 open, respectively, to the sections of the die cavity 74 defining the proximal and distal cast ring elements 36, 136, such that during the casting operation molten material 62 flows through the proximal transition 26 into the intermediate section of the side gate 74, from the intermediate section of the side gate 74 into slot openings 46 adjacent the side gate 74 and into the gap 106 between the peripheral surface 102 and the periphery 66 of the lamination stack 42 to form the cast skin 34, and from the distal transition 126 to the distal end face 148 of the lamination stack 42 to form the distal cast ring element 136.

The second die component 84 defines the peripheral surface 102 of the die cavity and partially defines an intermediate portion of each of the plurality of side gates 24 which are distributed radially along the peripheral surface 102. The intermediate portion of each side gate 24 extends axially between the proximal and distal transitions 26, 126 of the respective side gate 24. Each side gate 24 is continuously open to the die cavity 74 along the axial length of the die cavity 74, e.g., from the proximal end 32 of the die cavity 74 to the distal end 132 of the die cavity 74. As such, with the lamination stack 42 positioned in the die cavity 74 as shown in FIGS. 13 and 14, the opening of the side gate 24 to the die cavity 74 extends continuously the axial length of the periphery 66 of the lamination stack 42, and such that during casting, molten material 62 flows from the opening of the side gate 24 along the axial length of the die cavity 74 to form of each respective axial rib 20. In the example shown, the portion of the side gate 24 defined by the second die component 84 forms an intermediate portion 104 of the axial rib 20 intermediate the proximal and distal rib terminus 22, 122.

The first, second and third die components 82, 84, 86 are configured to interlock and/or be aligned to each other to align the intermediate section of each side gate 24 defined by the second component 84 with the corresponding proximal and distal transitions 26, 126 defined by the first and third die components 82, 86. Each of the proximal and distal transitions 26, 126 are tapered or otherwise similarly configured, for example, with a chord geometry to define a transverse cross-section which gradually decreases in cross-sectional area from the transverse cross-section of the intermediate portion 104 of the axial rib 20 to the terminating end of the respective proximal and distal rib terminus 22, 122 to minimize turbulence in the molten material 62 as the molten material 62 flows between the second die component 84 and the first and third die components 82, 86, while directing flow of the molten material 62 in the die cavity 74 during the casting operation to minimize and/or substantially eliminate porosity in the rotor casting 10, and in particular in the cast ring elements 36, 136. The cast distal and proximal rib terminus 122, 22 are tapered and/or similarly configured to gradually decrease in cross-sectional area from the transverse cross-section of the intermediate portion 104 of the rib 20 to the respective proximal and distal ends 32, 132 of the rotor casting 10, which is advantageous to finishing of the cast ring elements 36, 136 to form the shorting rings 60, 160, for example, by reducing the amount of material which must be removed to finish the shorting rings 60, 160.

Each of the side gates 24 may be characterized by a transverse cross-section that is generally semicircular in shape, as shown in FIGS. 5-7, to facilitate smooth, non-turbulent flow of the molten material 62 through the side gate, minimizing formation of porosity and die wear. Additionally the semicircular cross-section is easily and economically formed in the casting die 80, thus reducing die fabrication costs. The number and size of side gates 24 defined by the die cavity 74 may be configured to correspond and/or be relative to the size and/or volume of the cast ring elements 36, 136 and/or to correspond to the configuration and arrangement of the slots 44 in the lamination stack 42. By way of non-limiting example, the size and shape of the transverse cross-section of each the side gates 24 may be configured such that, as shown in FIG. 7, each gate overlaps, e.g., is directly adjacent, two consecutive slot openings 46 of the lamination stack 42, such that molten metal 62 flowing from the side gate 24 flows onto the periphery 66 between and on either side of the two consecutive slot openings 46 to form the cast skin 34, and, in the example of the rotor casting 110 shown in FIG. 12, into the slots 44 through the slot openings 46 to form the cast bar segments of the rotor casting 110. In one example, the number of side gates 24 and the transverse cross-sectional area of each side gate 24 may be related to the transverse cross-sectional area of each of the cast ring elements 36, 136, to ensure sufficient flow of molten material 62 through the side gates 24 to form the cast structure 14, and to form the distal cast ring element 136. The number of side gates 24 and the transverse cross-sectional area of each side gate 24 may be configured such that the total cross-sectional area of the plurality of side gates 24 is greater than the transverse cross-sectional area of the cast ring element 136, by a factor in the range of 1-1.5. For example, where the cross-sectional area of the distal cast ring element 136 is A mm$^2$, and the cross-sectional area of each of the side gates 24 is B mm2, then the required number of side gates 24 each having a cross-sectional area of B mm$^2$ may be determined as N>A/B, where N is the required number of side gates. Alternatively, where the number N of side gates 24 has been established, for example, to provide a sufficient number N of side gates 24 to align each of the side gates 24 with at least to slots 44 of the lamination stack 42, the minimum required cross-sectional area B of each of the side gates 24 may be determined as B>A/N. The examples provided herein are non-limiting, and it would be understood that other configurations, e.g., number, size and shape, of the side gates 24 may be used which provide sufficient axial flow of molten material 62 in the die cavity 74 to form the distal cast ring element 136.

The method includes introducing molten material 62 into the die cavity 74 via an inlet 38 and through a plurality of feeder gates 30 and flowing the molten material 62 into the proximal end 32 of the die cavity 74 via the plurality of feeder gates 30 and passages 72 fluidly connecting the feeder gates 30 to the die cavity 74. The molten material 62 represented by arrows in FIGS. 13 and 14 flows through the die cavity 74 and side gates 24 as shown in FIGS. 13 and 14 to form, respectively, the cast structure 14 of the rotor castings 10, 100. By way of non-limiting example, in the configuration shown in FIG. 13, the molten material 62 may be one of a copper alloy and an aluminum alloy. The examples provided herein are non-limiting, such that the molten material 62 may be any flowable, castable electrically conducting material. The molten material 62 flows from the feeder gates 30 into the first die component 82 and fills the section of the die cavity 74 defined by the first component 82 to form the proximal cast ring element 36 while quickly flowing through the proximal transitions of the respective side gates 24 and between the periphery 66 of the lamination stack 42 and the second die component 84 to form the cast skin 34 on the periphery 66 of the lamination stack 42 adjacent the proximal end 32 of the lamination stack 42. The molten material 62 flows from the proximal transition 26 through the side gates 24 to the distal transition 126 and into the third die component 86 to form the distal cast ring 136 element, and through the side gates 24 between the periphery 66 of the lamination stack 42 and the second die component 84 and, as shown for rotor castings 10, 110, into the slot openings 46 to form the cast skin 34 between the cast ribs 20 which are formed in the side gates 24.

Referring to the first and second example configurations shown in FIGS. 4-9 of a rotor casting 10, 100 including respective bar inserts 54, 154 inserted into the lamination stack 42 to define the conductor bars 52 of the rotor assembly 40 formed therefrom, and referring to the die cavity 74 of FIG. 13 showing a lamination pack 16 including the bar inserts 54 positioned in the die cavity 74, the method of casting the rotor casting 10, 100 includes the molten material 62 flowing from the feeder gate 30 into section of the die cavity 74 defined by the first die component 82 and proximal transitions of the side gates 24, and from the proximal transitions through the intermediate sections and distal transitions of the side gates 24 into the section of the die cavity 74 defined by third die component 86 to form, respectively, the proximal and distal cast ring 36, 136 elements. During forming of the cast end ring elements 36, 136, the molten material 62 quickly flows around the insert ends 56 and through the holes 64 in the insert ends 56 such that the molten material 62 in the cast ring elements 36, 136 solidifies uniformly and with minimal or substantially no porosity, such that the interface between the insert end 56 and the cast end ring element 36, 136 is absent of porosity or other solidification discontinuities such as cracks or folds which may affect the integrity of the electrical connection between the insert end 56 and the cast end ring element 36, 136. Concurrently with forming the cast ring elements 36, 136, the molten material 62 flows from the section of the die cavity 74 defined by the first die component 82 and from the side gates 24 between the periphery 66 of the lamination stack 42 and the second die component 84 to form the cast skin 34 on the periphery 66 of the lamination stack 42, where forming the cast skin 34 may include flowing molten metal 62 into the slot opening 46 adjacent the bar insert 54, for example, as shown in FIG. 7.

Figure 12:
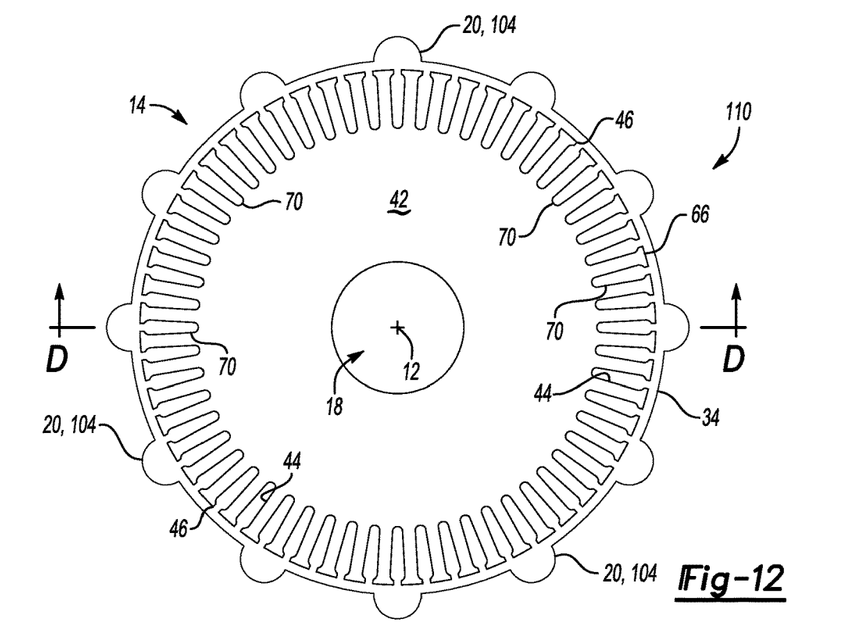
FIG. 12 is a schematic cross-sectional view of section B-B of the third example configuration of the rotor casting of FIG. 1 including the lamination stack and cast conductor bar segments.

Referring to the third example configuration shown in FIGS. 11 and 12 of a rotor casting 110 including integrally cast bar segments 70 defining the conductor bars 52 of a rotor assembly 140 formed therefrom, and referring to the die cavity 74 of FIG. 14 showing the lamination stack 42 positioned in the die cavity 74 such that the empty slots 44 of the lamination stack 42 are in fluid communication with the die cavity 74, the method of casting the rotor casting 110 includes flowing the molten material 62 from the feeder gate 30 into section of the die cavity 74 defined by the first die component 82 to form the proximal cast ring element 36, and flowing molten metal 62 via the proximal cast ring element 36 through the proximal transitions of the side gates 24 into intermediate sections and distal transitions of the side gates 24 such that molten metal 62 flows through the side gates to the section of the die cavity 74 defined by third die component 86 to form the distal cast ring 136 elements. Concurrently with forming the cast ring elements 36, 136, the molten material 62 flows from the section of the die cavity 74 defined by the first die component 82 and from the side gates 24 between the periphery 66 of the lamination stack 42 and the second die component 84 into the slots 44 via the slot openings 46 on the periphery 66 and proximal end face 48 of the lamination stack 42 to form the cast bar segments 70, and to form the cast skin 34 on the periphery 66 of the lamination stack 42, for example, as shown in FIG. 12. The molten material 62 may cool and solidify in the slots 44 faster than the molten material 62 in the side gates 24, due to, for example, the smaller relative cross-sectional area and larger relative surface to volume ratio of the slot relative to the side gate, such that the distal cast ring element 136 may be formed substantially of molten material 62 flowing into the section of the die cavity 74 defined by the third die component 86 via the side gates 24. The molten material 62 in the cast ring elements 36, 136 and in the cast bar segments 70 formed in the slots 44 of the lamination stack 42 solidifies uniformly and with minimal or substantially no porosity, such that the cast bar segments 70 and the cast ring elements 36, 136 and the interface therebetween is absent of porosity or other solidification related discontinuities such as cracks or folds which may affect the integrity of the electrical connection between the cast bar segments 70 defining the conductor bars 52 of the rotor casting 110 and the cast ring elements 36, 136 of the rotor casting 110.

The molten material 62 solidifies in the die cavity 74 to form the cast structure 14 of the rotor casting 10, 100, 110, and the rotor casting 10, 100, 110 is removed from the die cavity 74 and casting die 80. As described previously herein, the finishing operations are performed on the rotor casting 10, 100, 110 to form the rotor assembly 40, including removing material from the perimeter of the rotor casting 10 to define the finished surface 90. By way of example, forming the finished surface 90 may include removing all of the cast ribs 20 and cast skin 34 and additionally removing material from the peripheral surface 66 of the lamination stack 42 including material in the slot opening 46 such that the conductor bars 52 are exposed at the periphery 66 of the rotor assembly 40, as shown in FIG. 2 with reference to FIGS. 4 and 10.

Additional machining and/or finishing may be performed on either or both of the proximal and distal cast ring 36, 136 elements to finish forming the respective proximal and distal shorting rings 60, 160 of the rotor assembly 40. It would be understood that the cast feed members 28 would be removed from the rotor casting 10, 100, 110, either at time of casting or subsequently, as a step in finishing the rotor casting 10 to provide the rotor assembly 40. Removing the cast feed members 28 from the rotor casting 10, 100, 110 may include machining or other finishing of the proximal end 32 of the rotor casting 10, 100, 110 to form the proximal shorting ring 60. Further, machining and/or finishing may be performed on the rotor assembly 40 to balance the rotor assembly 40. For example, additional material may be removed from one or more surfaces 66, 90 of the rotor assembly 40 such as the periphery 66 of the lamination pack 16 and/or surfaces 66, 90 defined by the proximal and/or distal shorting rings 60, 160 to balance the rotor assembly 40 about the axis of rotation 12.

The reduced porosity of the cast structure 14 provided by the casting method described herein improves electrical conductivity and simplifies rotor balancing of the rotor assembly 40 formed from the rotor casting 10, 100, 110, which may significantly improve electrical and mechanical performance of the rotor assembly 40. In addition, the rotors formed by the method exhibit excellent electrical conductivity and efficiency during operation which may be attributed to direct contact between the end of each conductor bar 52 and the cast ring elements 36, 136 forming the shorting rings 60, 160. In particular, the method forms a strong joint between the plurality of conductor bars 52 and the cast ring elements 36, 136 forming the shorting rings 60, 160 that can adequately withstand inertial forces during rotor operation. As such, the rotor assemblies 40 formed by the method are useful for applications requiring electromagnetic devices (not shown) having excellent power density.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of forming a rotor casting, the method comprising:
   inserting a lamination stack into a die cavity of a casting die;
   the lamination stack including:
      a distal end face and a proximal end face;
      an axis of rotation; and
      a plurality of axial slots distributed radially on an external peripheral surface of the lamination stack relative to the axis of rotation and extending between the proximal and distal end faces;
   the die cavity having a proximal end and a distal end;
   the die cavity defining a cast structure of the rotor casting including:
      a proximal cast end ring;
      a distal cast end ring; and
      a plurality of cast axial ribs distributed radially on the external peripheral surface of the lamination stack relative to the axis of rotation;
   wherein each of the plurality of cast axial ribs extends between the proximal and distal cast end rings;
   wherein each of the plurality of axial ribs extends radially outward from the external peripheral surface of the lamination stack; and
   wherein the cast structure incorporates the lamination stack.

2. The method of claim 1, further comprising:
   the casting die having a gating system including:
      a plurality of side gates defined by the die cavity and distributed radially relative to the longitudinal axis;
      each side gate defining a continuous gate opening extending axially between the proximal and distal ends of the die cavity such that the side gate opening is immediately adjacent the periphery, distal end face and proximal end face of the lamination stack;
      the plurality of side gates configured to flow molten material from the proximal end of the die cavity to the distal end of the die cavity and to form the plurality of cast axial ribs;

the method further comprising:

flowing molten material into the die cavity via the plurality of side gates; and solidifying the molten material to form the cast structure of the rotor casting.

3. The method of claim 2, further comprising:

the gating system including a plurality of feeder gates distributed radially in fluid communication with the proximal end of the die cavity to receive the molten material into the die cavity;

the plurality of feeder gates in fluid communication with the plurality of side gates;

the method further comprising:

flowing molten material into the die cavity via the plurality of feeder gates.

4. The method of claim 1, wherein the cast structure includes a plurality of cast bar segments formed in the plurality of axial slots of the lamination pack, each of the cast bar segments extending between and integral to the proximal and distal cast end rings.

5. The method of claim 1, further comprising:

inserting a bar insert into each of the plurality of axial slots of the lamination stack prior to inserting the lamination stack into the die cavity;

wherein each bar insert includes first and second insert ends extending respectively from the proximal and distal end faces of the lamination stack after insertion to the lamination stack;

flowing molten material in contact with the first and second insert ends such that the first insert ends are fully encapsulated in the proximal cast end ring and the second insert ends are fully encapsulated in the distal cast end ring.

6. The method of claim 5, wherein the first and second insert ends each define a hole;

the method further comprising:

flowing molten material through the hole during casting of the proximal and distal cast end rings.

7. The method of claim 5, further comprising:

positioning the lamination stack in the die cavity to define a gap between the peripheral surface of the lamination stack and the die cavity; and flowing molten material into the gap to form a cast peripheral skin;

wherein the cast peripheral skin at least partially encapsulates the peripheral surface of the lamination stack.

8. A method of forming a rotor casting, the method comprising:

inserting a lamination stack into a die cavity of a casting die;

the lamination stack including:

a distal end face and a proximal end face;

an axis of rotation; and a plurality of axial slots distributed radially on an external peripheral surface of the lamination stack relative to the axis of rotation and extending between the proximal and distal end faces;

the die cavity having a proximal end and a distal end;

the die cavity defining a cast structure of the rotor casting including:

a proximal cast end ring;

a distal cast end ring; and a plurality of cast axial ribs distributed radially on the external peripheral surface of the lamination stack relative to the axis of rotation;

wherein each of the plurality of cast axial ribs extends between the proximal and distal cast end rings;

wherein the cast structure incorporates the lamination stack; and wherein the cast structure further comprises a cast peripheral skin extending from the plurality of cast axial ribs to at least partially encapsulate the external peripheral surface of the lamination stack.

9. A method of forming a rotor casting, the method comprising:

inserting a lamination stack into a die cavity of a casting die;

the lamination stack including:

a distal end face and a proximal end face;

an axis of rotation; and a plurality of axial slots distributed radially on an external peripheral surface of the lamination stack relative to the axis of rotation and extending between the proximal and distal end faces;

the die cavity having a proximal end and a distal end;

the die cavity defining a cast structure of the rotor casting including:

a proximal cast end ring;

a distal cast end ring; and a plurality of cast axial ribs distributed radially on the external peripheral surface of the lamination stack relative to the axis of rotation;

wherein each of the plurality of cast axial ribs extends between the proximal and distal cast end rings;

wherein the cast structure incorporates the lamination stack; and wherein the cast structure further comprises a plurality of cast feed members extending axially from the proximal cast end ring.

10. The method of claim 9, wherein the plurality of cast feed members are distributed radially on the proximal cast end ring.

11. The method of claim 9, wherein each respective cast feed member is positioned radially between a respective adjacent pair of cast axial ribs.

* * * * *